Figure 1:
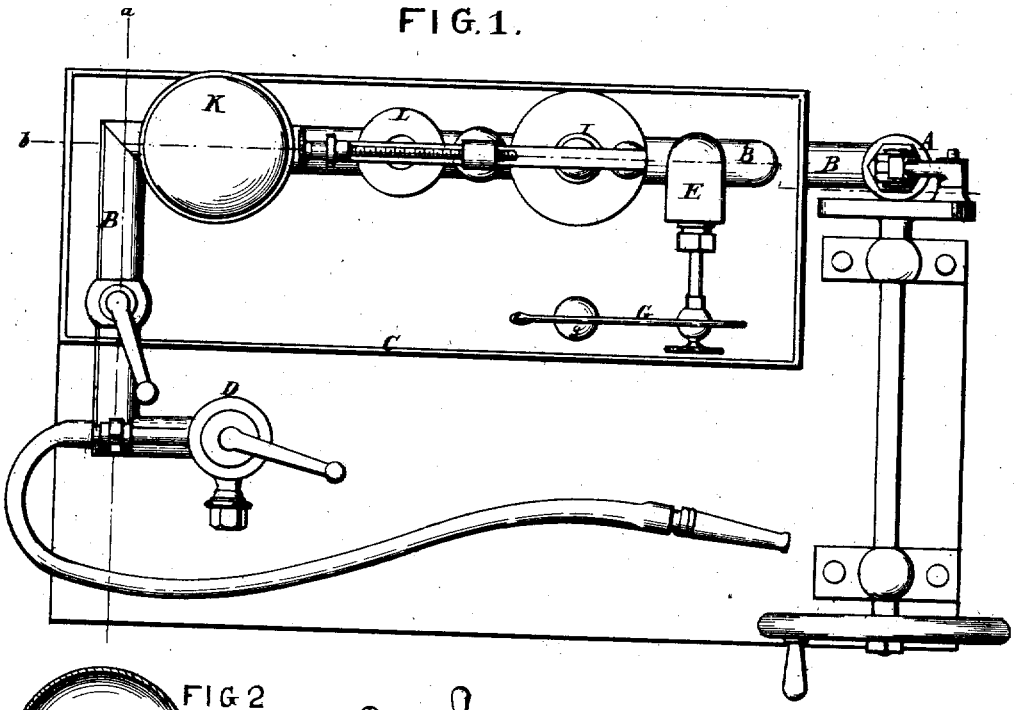

J. C. Hagan, 2. Sheets, Sheet, 1.

Pump.

No. 4,167. Reissued Oct. 25. 1870.

WITNESSES.
Wm. H. Breeton Jr
Jas L Ewin

INVENTOR.
John C. Hagan
By Knight Bros
Attorneys

THE NORRIS PETERS CO., PHOTO-LITHO., WASHINGTON, D. C.

J. C. Hagan, 2. Sheets. Sheet. 2.

Pump.

No. 4,167. Reissued Oct. 25. 1870.

WITNESSES.
Wm. H. Burton Jr
Jas L. Ewin

INVENTOR.
John C. Hagan
By Knight Bros
Attorneys

THE NORRIS PETERS CO. PHOTO-LITHO. WASHINGTON, D. C.

UNITED STATES PATENT OFFICE.

JOHN C. HAGAN, OF NASHVILLE, TENNESSEE, ASSIGNOR OF ONE-HALF INTEREST TO JAMES WALKER, ISAIAH D. WALKER, AND IVAN N. WALKER.

IMPROVEMENT IN WATER-SUPPLYING APPARATUS.

Specification forming part of Letters Patent No. 104,019, dated June 7, 1870; reissue No. 4,167, dated October 25, 1870.

I, JOHN C. HAGAN, of Nashville, in the county of Davidson and State of Tennessee, have invented certain new and useful Improvements in Supplying Towns and Cities with Water for domestic, manufacturing, fire, and other purposes, of which the following is a specification:

*Nature and Objects of the Invention.*

My invention may be used in various ways: For example, first, I employ, in combination with a main supply-pipe, and one or more pumps for forcing water through it, a pipe communicating with the said supply-pipe and rising to a sufficient height to sustain, by the hydrostatic column, the amount of pressure required for ordinary purposes, and I further provide the elevated pipe with a valve, by means of which the pressure within the supply-pipe may be increased, as required. I am thus enabled to supply water for ordinary consumption directly from the pump or pumps, or to instantaneously provide, at any part of the distributing-pipes, a head or force of water sufficient for extinguishing fires without the use of portable or local engines.

Second, I employ one or more pumps, by which water may be taken from a river, lake, well, or other source of supply, and forced through a system of main and distribution pipes directly to the places where the water is taken for use, and at a convenient point in the main pipe, or between two sections of the main, I apply a check-valve, arranged to prevent reflux of water through the main when the pumps are stopped, at which time the supply may be furnished by a reservoir which has been charged by the overplus of water during the working of the pumps. A check-valve is also provided, to permit the flow of water from the reservoir into the main, when the pressure in the main is reduced by the stoppage of the pump or pumps, or by the use of an excessive quantity of water, but to prevent the reflux of water through the same port from the main into the reservoir, when the pressure in the main is increased. The valves for these two purposes may, if preferred, be combined in one double-acting valve, with two seats, as hereinafter described. The overplus of water which may be pumped is discharged into the reservoir through a pipe, which may rise to any suitable height to maintain the requisite pressure in the main for ordinary purposes, and the said pipe is, furthermore, provided with a valve, to close it when a greater pressure or head of water is required.

Third, I provide, either in direct connection with the elevated pipe, above referred to, or in addition thereto, or, under some circumstances, instead thereof, a safety-valve, which may be adjusted to resist any amount of pressure within the main. Any water which is forced through this valve under excessive pressure will be discharged into the reservoir, when one is used.

Fourth, I provide, in connection with and adjacent to the aforesaid safety-valve or elevated pipe, one or more air-chambers, to prevent too sudden variations in the pressure or flow of water within the main, and also, when a reservoir is used under the conditions first stated, to prevent injurious concussion which would otherwise be liable to result from the contact of a rapid current of water from the pump or pumps with a less rapid current flowing from the reservoir into the main. I also provide air-chambers, in connection with or in close proximity to the various discharge-plugs or hydrants in the distribution-pipes, for the purpose of preventing concussion from the reaction of the water under a sudden stoppage of the discharge from any one or more of the plugs, and also for the purpose of rendering the discharge more uniform.

In order that my invention may be clearly understood, I will proceed to describe the construction and operation of an apparatus in which all the above conditions are combined, but in which, as it will clearly appear, the various parts are not all indispensable each to the other.

*Description of the Accompanying Drawing.*

Figure 2:
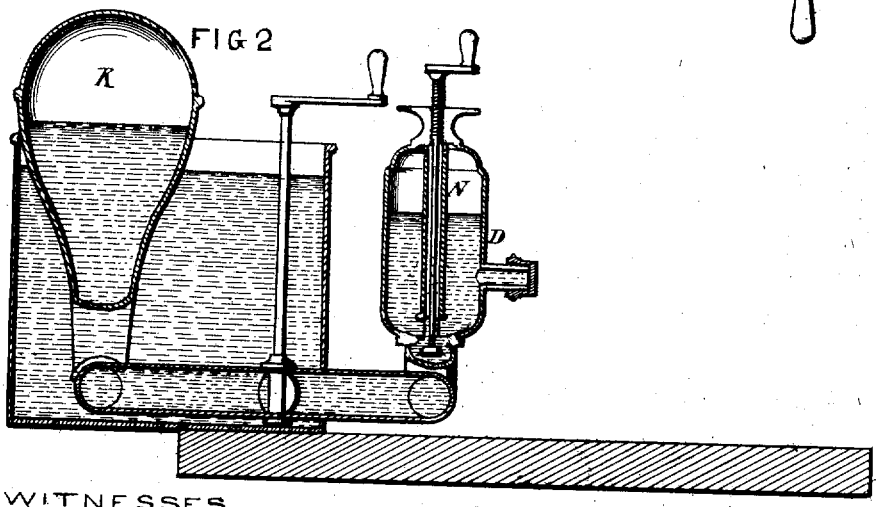
Figures 3, 4:
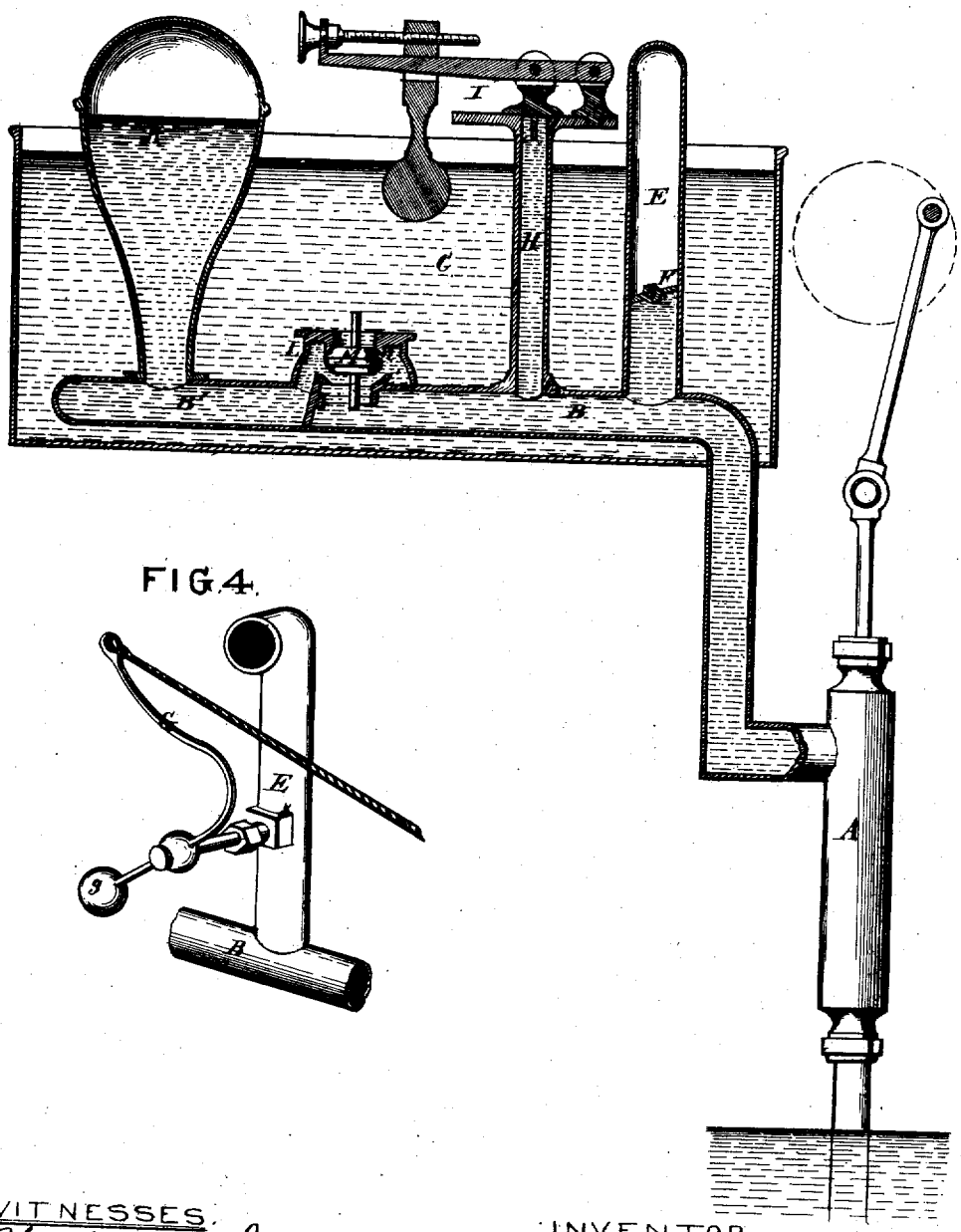

Figure 1 is a plan or top view of the apparatus. Fig. 2 is a transverse vertical section taken on the line *a a*, Fig. 1. Fig. 3 is a longitudinal vertical section taken on the line *b b*, Fig. 1. Fig. 4 is a perspective view of the elevated pipe and valve, hereinafter more particularly described.

*General Description.*

A represents a pump, of which one or more may be used, of any suitable construction, and driven by any suitable power. B is a main pipe, carrying water from the pump A, and connecting with a second main, B′, or with a second section of the main, a check-valve, M, seated at *l′*, being employed, to prevent any reflux of water from B′ to B. From the pipe B a pipe, E, rises to any necessary height, to maintain within the pipe B an adequate pressure for ordinary purposes. Surplus water overflows from the pipe E, and is received in a reservoir or basin, C. F is a throttle-valve, to close the pipe E when greater pressure is required in the main. Upon the shaft of the valve F is a lever, G, on one end of which is a weight, *g*, to keep the valve open. To the other end of said lever is attached a cord or chain, to close the valve when required. I is a safety-valve surmounting a pipe, H, which may perform all the functions of the pipe E. The said safety-valve may be adjusted, to limit at any desired point the pressure to be sustained within the pipes B or B′, or their branches. The reservoir communicates with the pipe B′ through a port guarded by a check-valve, M, of any suitable construction, which may be seated at *l*, so as to prevent reflux of water from the pipe B′ into the reservoir. One double valve, M, with two seats, *l l′*, working in a chamber, L, may be adapted to prevent the reflux of water from the pipe B′, either into the pipe B or the reservoir C, but the functions to be performed by such valve or valves do not necessitate such a connected arrangement. K is an air-chamber, to prevent sudden concussions or variations in pressure within the pipe B or B.′ At suitable points along the line or in the distribution-pipes are placed, either above or below ground, hydrants D, provided at their sides or top with plugs, from which water may be taken, or to which hose may be attached for extinguishing fires, or for other purposes. Each of the hydrants D is provided with an air-chamber, N, arranged either above the plugs or around a pipe descending within said air-chamber, in a well-known manner. These air-chambers serve to prevent concussion from the reaction of the water under a sudden stoppage of the discharge from any one or more of the plugs, and to render the discharge more uniform.

*Operation.*

Power being applied to the pump or pumps A, and the valve F being open, water will rise in the elevated pipe E, developing a pressure corresponding with the height of the column in said pipe. If this pressure is sufficient to raise the check-valve from the seat *l′* and close the check-valve on the seat *l*, the effect will be to supply the main B′, and the distribution-pipes connected therewith, directly from the pump, and any superfluous water overflowing from the pipe E will be caught in the reservoir C and retained for use at any time when the pressure in the pipe B is so far reduced, either by the stoppage of the pump or pumps, or by the excessive quantity of water used, as to permit the valve to open from the seat *l*. The pump or pumps may thus be worked during the day, or part of the day, when a large quantity of water or a strong head is required, and at other times the engines may be stopped, and the accumulations in the reservoir may furnish the supply.

When it is desired to use the water for extinguishing fires, without the use of local or portable engines, or when a very strong head is wanted for any purpose, the valve F is closed, cutting off the discharge into the reservoir, and applying the entire power of the pump or pumps to forcing water through the pipes B and B′ and the branch or distribution-pipes to any locality where the exigency may require it, with any degree of pressure to which the safety-valve I may be adjusted, the power applied to the pumps being increased as required.

When the invention is used without a basin or reservoir, the pipe E, valve F, chamber L, and valve M may be dispensed with, and the following combination is used instead of the former, that is, the valve I, chamber K, and hydrant D, in combination with pipe B and pump A, or pumps, as the operator may elect.

*Claims.*

I claim as my invention—

1. An ascending pipe, provided with a valve, in combination with the pipe B and a pump or pumps, adapted and arranged to deliver water under varying pressures, as required, substantially as herein explained.

2. The reservoir C, in combination with a pump or pumps, an ascending pipe or pipes, the pipes B and B′, and a check-valve, to prevent the reflux of water from the pipe B′ into the reservoir C, as explained.

3. The combination of a safety-valve, I, and an air-chamber or air-chambers with the pipe or pipes B B′, one or more pumps, A, and a discharging plug or plugs, of any suitable construction.

4. The valves F, I, and M, and air-chamber K, in combination with the pipe B and hydrant D, when constructed and arranged to operate substantially as herein set forth.

JOHN C. HAGAN.

Witnesses as to JOHN C. HAGAN:
WM. H. BRERETON, Jr.,
JAS. L. EWIN.

JAMES WALKER,
I. D. WALKER,
I. N. WALKER,
*Joint Assignees of Half the Patent.*

Witnesses as to JAMES, I. D., and I. N. WALKER:
WM. D. TALBOT,
PHINEHAS GARRETT,
WM. G. MOPEY.